US010162213B2

(12) United States Patent
Yoon et al.

(10) Patent No.: US 10,162,213 B2
(45) Date of Patent: Dec. 25, 2018

(54) METHOD OF PRODUCING POLARIZING LIGHT-EMITTING FILM USING PHOTOLUMINESCENT FERROELECTRIC LIQUID CRYSTAL MOLECULES AND LIQUID CRYSTAL DISPLAY COMPRISING THE SAME

(71) Applicant: Korea Advanced Institute of Science and Technology, Daejeon (KR)

(72) Inventors: Dong Ki Yoon, Daejeon (KR); Min-Jun Gim, Daejeon (KR)

(73) Assignee: KOREA ADVANCED INSTITUTE INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/296,848

(22) Filed: Oct. 18, 2016

(65) Prior Publication Data

US 2017/0108751 A1    Apr. 20, 2017

(30) Foreign Application Priority Data

Oct. 20, 2015 (KR) .................. 10-2015-0146225
Sep. 8, 2016 (KR) .................. 10-2016-0115457

(51) Int. Cl.
| | | |
|---|---|---|
| *G02F 1/133* | (2006.01) | |
| *G02F 1/1335* | (2006.01) | |
| *G02B 5/20* | (2006.01) | |

(52) U.S. Cl.
CPC ......... *G02F 1/133528* (2013.01); *G02B 5/20* (2013.01); *G02F 1/133617* (2013.01)

(58) Field of Classification Search
CPC ................................................ G03F 1/133528
See application file for complete search history.

(56) References Cited

U.S. PATENT DOCUMENTS

2012/0147304 A1* 6/2012 Yanai ............... G02B 5/3033
349/96
2014/0368544 A1* 12/2014 Kobayashi ........ G02B 27/0101
345/633

FOREIGN PATENT DOCUMENTS

| KR | 20070107498 A | 11/2007 |
|---|---|---|
| KR | 1020070107498 A | 11/2007 |

(Continued)

OTHER PUBLICATIONS

Yoon et al. "Highly Polarized Fluorescent Illumination Using Liquid Crystal Phase" www.acsami.org. pp. 3143-3149: Jan. 19, 2016.*

(Continued)

*Primary Examiner* — Chanceity N Robinson
(74) *Attorney, Agent, or Firm* — HULTQUIST, PLLC; Steven J. Hultquist (57) ABSTRACT

A method of producing a polarizing light-emitting film using photoluminescent ferroelectric liquid crystal molecules, and a liquid crystal display including the polarizing light-emitting film, are described. The method includes forming a droplet by positioning photoluminescent ferroelectric liquid crystal molecules on a substrate modified to be molecular phobic, and applying an electric field in a horizontal direction to uniaxially orient the liquid crystal molecules. By such method, it is possible to produce the polarizing light-emitting film in which the photoluminescent ferroelectric liquid crystal molecules are uniaxially oriented to simultaneously act as the liquid crystal layer, the polarizing plate, and the color filter. The liquid crystal display including the polarizing light-emitting film is capable of improving polarization and contrast, and implementing colors even without a polarizing plate and color filter, thereby increasing light efficiency and power efficiency and reducing production cost.

11 Claims, 6 Drawing Sheets

(Continued)

(6 of 6 Drawing Sheet(s) Filed in Color)

(56) References Cited

FOREIGN PATENT DOCUMENTS

| KR | 10-1174749 B1 | 8/2012 |
| KR | 10-1176654 B1 | 8/2012 |
| KR | 1020140086370 A | 7/2014 |
| KR | 1020140115180 A | 9/2014 |

OTHER PUBLICATIONS

Kim, H., et al., "Alignment of Helical Nanofilannents on the Surfaces of Various Self-Assembled Monolayers", Soft Matter, 2013, pp. 6185-6191, vol. 9, Publisher: Royal Society of Chemistry.*

Coleman, D.A., et al., "Polarization-Modulated Smectic Liquid Crystal Phases", "Science", Aug. 29, 2003, pp. 1204-1211, vol. 301.

Gim, M.-J., et al., "Highly aligned polarization splay modulated (B7) smectic liquid crystal with linearly polarized light emission", "Korea Polymer Society 2015 Spring Conference Abstracts", Apr. 9, 2015, p. 144 (Abstract).

Gim M.-J., et al., "Electric Field-Induced Uniaxial Orientation of Polarization Splay Modulated (B7) Liquid Crystal Phase", "The 2nd Asian Conference on Liquid Crystals (ACLC 2015), Busan, Republic of Korea", Jan. 19-21, 2015.

Deb, R., et al., "Four-ring Achiral Unsymmetrical Bent Core Molecules Forming Strongly Fluorescent Smetic Liquid Crystals With Spontaneous Polar and Chiral Ordered B7 and B1 Phases", Journal of Materials Chemistry, 2010, pp. 7332-7336, vol. 20.

Yoon, D.K., et al., "Organization of the Polarization Splay Modulated Smectic Liquid Crystal Phase by Topographic Confinement", PNAS, 2010, pp. 21311-21315, vol. 107, No. 50.

Zhu, C., et al., "Topological Ferroelectric Bistability in a Polarization-Modulated Orthogonal Smectic Liquid Crystal", Journal of the American Chemical Society, 2012, pp. 9681-9687, vol. 134.

Kim, H., et al., "Alignment of Helical Nanofilaments on the Surfaces of Various Self-Assembled Monolayers", "Soft Matter", 2013, pp. 6185-6191, vol. 9, Publisher: Royal Society of Chemistry.

* cited by examiner

METHOD OF PRODUCING POLARIZING LIGHT-EMITTING FILM USING PHOTOLUMINESCENT FERROELECTRIC LIQUID CRYSTAL MOLECULES AND LIQUID CRYSTAL DISPLAY COMPRISING THE SAME

CROSS-REFERENCE TO RELATED APPLICATIONS

This application claims priority under 35 U.S.C. § 119 of Korean Patent Application No. 10-2015-0146225 filed Oct. 20, 2015 and Korean Patent Application No. 10-2016-0115457 filed Sep. 8, 2016. The disclosures of such Korean priority patent applications are hereby incorporated herein by reference in their respective entireties, for all purposes.

TECHNICAL FIELD

The present invention relates to a method of producing a polarizing light-emitting film using photoluminescent ferroelectric liquid crystal molecules, and a liquid crystal display including the polarizing light-emitting film, and more specifically, to a method of producing a polarizing light-emitting film including: forming a droplet by positioning photoluminescent ferroelectric liquid crystal molecules on a substrate modified to be molecular phobic, and applying an electric field in a horizontal direction to uniaxially orient the liquid crystal molecules, and a liquid crystal display including the polarizing light-emitting film.

BACKGROUND ART

Liquid crystal molecules have been widely used as photomodulation materials due to characteristics such as a self-assembly property, modulation of electrical and optical properties by an external stimulation, and are materials with functionality essential for developing organic light-related materials in the future. Since the liquid crystal molecules basically have a long range order, the liquid crystal molecules aligned on a physically and chemically surface-treated substrate have an alignment effect maintained up to relatively distant molecules. A liquid crystal structure formed by a self-assembly phenomenon to which the long range order of the liquid crystal molecules contributes, has a large birefringence with regard to light, and is able to be modulated and controlled through a relatively easy method by applying external force such as an electric field, a magnetic field, friction force, etc., which is widely used as an optical material.

It was found through x-ray scattering experiment and freeze-fracture TEM experiment (Science 301, 1204 (2003)) that ferroelectric liquid crystal molecules having luminescence properties have a layered structure spontaneously formed in a nano level, the layered structure forms a bundle of microfilaments, and crowd growth thereof forms significantly various optical organizations. In addition, the ferroelectric liquid crystal molecules have a fluorescence property in a visible light region due to four benzene groups present in the molecule, which is applicable as an optical device having high performance with only a single molecule.

For practical application as the optical materials, a single optical organization needs to be expressed, and uniaxial orientation and modulation thereof are required to be generated. However, the existing method for controlling liquid crystal orientation is not able to control a growth direction of the ferroelectric liquid crystal molecules having luminescence properties, and thus, various forms of optical organizations and alignments are not able to be achieved. Accordingly, there is difficulty in using the ferroelectric liquid crystal molecule as the optical material.

The existing related arts, Korean Patent No. 10-1176654 suggests a method of adding the fluorescence property through a process with a different form of organic liquid-crystal molecules in order to use the ferroelectric liquid crystal molecules for an optical device, and Korean Patent No. 10-1174749 describes a method of mixing dye with a liquid crystal compound and a method of forming a polymer film including a dichroic light-absorbing guest by polymerizing the liquid crystal molecules in order to impart a color developing property to the liquid crystal layer forming the optical device. However, those techniques are the method of mixing the liquid crystal molecules or the dye, or the method of polymerizing the liquid crystal molecules for the orientation and the luminescence properties of the liquid crystal molecules, which have a problem in that intrinsic characteristics of the liquid crystal are inhibited by the dye which is a light-emitting material, or production processes such as a polymerization reaction of the organic liquid crystal molecules need to be added.

Therefore, the present inventors made an effort to develop a method of using the photoluminescent ferroelectric liquid crystal molecules for the liquid crystal display, and as a result, found that when a droplet of the ferroelectric liquid crystal molecules was formed on a substrate modified to be molecular phobic, and an electric field in a horizontal direction was applied, a polarizing light-emitting film in which the ferroelectric liquid crystal molecules are uniaxially oriented was able to be produced, and further, when the produced polarizing light-emitting film was used, the liquid crystal display was capable of being implemented even without one polarizing plate and color filter, and completed the present invention.

RELATED ART DOCUMENT (Patent Document 1) Korean Patent No. KR 10-1176654
(Patent Document 2) Korean Patent No. KR. 10-1174749

DISCLOSURE

Technical Problem

An object of the present invention is to provide a method of producing a polarizing light-emitting film comprises: (a) modifying a substrate surface to be molecular phobic; (b) forming a droplet of photoluminescent ferroelectric liquid crystal molecules on the modified substrate surface; and (c) applying an electric field in a horizontal direction while cooling the droplet thereby uniaxially orienting the liquid crystal molecules.

In addition, another object of the present invention is to provide a liquid crystal display comprising: a light generator; a polarizer; and a polarizing light-emitting film, wherein the polarizing light-emitting film includes uniaxially oriented photoluminescent ferroelectric liquid crystal molecules.

Technical Solution

In order to achieve the foregoing objects, the present invention provides a method of producing a polarizing light-emitting film comprises: (a) modifying a substrate surface to be molecular phobic; (b) forming a droplet of photoluminescent ferroelectric liquid crystal molecules on the modified substrate surface; and (c) applying an electric field in a horizontal direction while cooling the droplet thereby uniaxially orienting the liquid crystal molecules.

The modifying of the substrate surface to be molecular phobic may use at least one selected from the group consisting of a self-assembled monolayer (SAM) technique, a Teflon coating method, and a vertical alignment polyimide film coating method.

The self-assembled monolayer (SAM) technique may use at least one selected from the group consisting of FOTS (fluorinated tri-decafluoro-1,1,2,2-tetrahydrooctyl-trichlorosilane), $SiO_x$ (where x is $0<x<2$), and DMOAP (dimethyloctadecyl[3-(trimethoxysilyl)propyl]ammonium chloride).

The droplet of the photoluminescent ferroelectric liquid crystal molecules may be formed on the substrate surface heated above an isotropic phase temperature.

The photoluminescent ferroelectric liquid crystal molecule may be 4-[(2-hydroxy-4-tetradecyloxy-benzylidene)-amino]-benzoic acid 3-[(2-hydroxy-4-tetradecyloxy-benzylidene)-amino]-phenyl ester.

A layer plane of the liquid crystal molecules in the droplet may be parallel to the substrate.

A bent direction of the liquid crystal molecules in the droplet may be oriented parallel to a direction of the applied electric field direction.

In addition, the present invention also provides a liquid crystal display comprising: a light generator; polarizer; and a polarizing light-emitting film, wherein the polarizing light-emitting film includes uniaxially oriented photoluminescent ferroelectric liquid crystal molecules.

The polarizing light-emitting film may absorb ultraviolet rays and emit visible light.

The polarizing light-emitting film may emit at least one light selected from the group consisting of red light, green light, and blue light.

A luminescence intensity of the polarizing light-emitting film may be adjusted depending on an electric field intensity.

An arrangement direction of the photoluminescent ferroelectric liquid crystal molecules may be changed depending on the electric field intensity.

The photoluminescent ferroelectric liquid crystal molecule may be 4-[(2-hydroxy-4-tetradecyloxy-benzylidene)-amino]-benzoic acid 3-[(2-hydroxy-4-tetradecyloxy-benzylidene)-amino]-phenyl ester.

DESCRIPTION OF DRAWINGS

The patent or application file contains at least one drawing executed in color. Copies of this patent or patent application publication with color drawing(s) will be provided by the Office upon request and payment of the necessary fee.

BEST MODE

Unless defined otherwise, all the technical and scientific terms used herein have the same meanings as those generally understood by persons skilled in the art to which the present invention pertains. Generally, the nomenclature used herein are well known and commonly employed in the art.

The present inventors made an effort to develop a method of using photoluminescent ferroelectric liquid crystal molecules for a liquid crystal display, and as a result, found that when a droplet of the ferroelectric liquid crystal molecules was formed on a substrate modified to be molecular phobic, and an electric field in a horizontal direction was applied, a polarizing light-emitting film in which the ferroelectric liquid crystal molecules are uniaxially oriented was able to be produced, and further, when the produced polarizing light-emitting film was used, the liquid crystal display was capable of being implemented even without one polarizing plate and color filter.

An object of the present invention is to provide a liquid crystal display comprising: a light generator; a polarizer; and a polarizing light-emitting film, wherein the polarizing light-emitting film includes uniaxially oriented photoluminescent ferroelectric liquid crystal molecules. In addition, the liquid crystal display sequentially includes the light generator, the polarizer, and the polarizing light-emitting film including the uniaxially oriented photoluminescent ferroelectric liquid crystal molecules, such that light passing through the polarizer from the light generator arrives at the polarizing light-emitting film.

Figure 1:
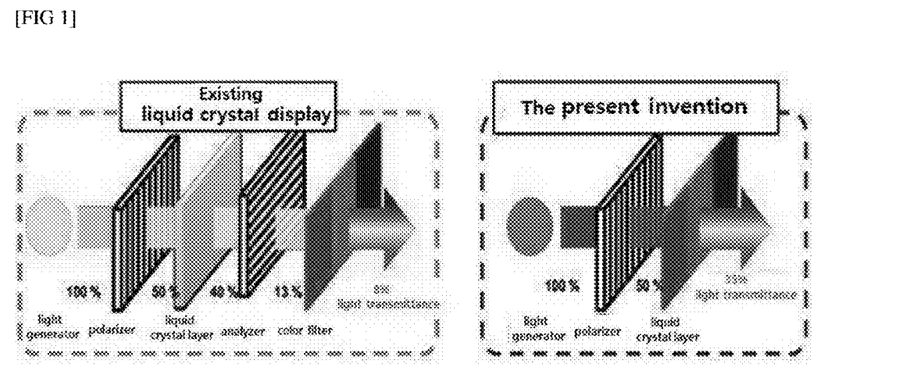
FIG. 1 illustrates a configuration of a liquid crystal display according to the present invention and a configuration of the existing liquid crystal display, and light transmittance thereof.

In the present invention, the liquid crystal display substitutes a liquid crystal layer, an analyzer, and a color filter of the light generator, which are components of the existing liquid crystal display, with the polarizing light-emitting film in which the liquid crystal molecules are uniaxially oriented, as illustrated in FIG. 1. The polarizing light-emitting film, which is a polarizing light-emitting film specifically produced by uniaxially orienting the ferroelectric liquid crystal molecules having the luminescence properties, has polarization and luminescence properties by uniaxially orienting the liquid crystal molecules in a direction of the electric field to be applied, and simultaneously acts as the liquid crystal layer that controls light phase, as the analyzer that adjusts light transmittance with regard to the controlled phase, and as the color filter that implements colors in the existing liquid crystal display. The existing liquid crystal display has 8% light transmittance while passing light through the polarizer, the liquid crystal layer, the analyzer, and the color filter, wherein the light is produced from the light generator. However, the liquid crystal display including the polarizing light-emitting film simultaneously acting as the liquid crystal layer, the analyzer, and the color filter according to the present invention includes the light generator, the polarizer, and the polarizing light-emitting film to have about 35% light transmittance. Since light efficiency and power efficiency are high as the light transmittance increases, the liquid crystal display of the present invention has high light efficiency and power efficiency as compared to the existing liquid crystal displays.

In the present invention, the light generator serves to illuminate the liquid crystal display by irradiating light, and is a light source device having a wavelength band of 400 nm or less that is a light absorption region of the photoluminescent ferroelectric liquid crystal molecules. Specifically, the light generator may be light sources known in the art, for example, a hot cathode fluorescent lamp (HCFL), a cold cathode fluorescent lamp (CCFL), an external electrode fluorescent lamp (EEFL), a light emitting diode (LED), etc., but is not limited thereto.

In the present invention, the polarizer means a lower polarizing plate, specifically, a polarizing plate positioned at a light source side on the basis of the liquid crystal layer (the polarizing light-emitting film in the present invention). The polarizer is not limited as long as it is able to convert the light from the light source into linearly polarized light, and for example, may be a general polyvinyl alcohol (PVA)-based polarizer, or may be provided with a protective layer or a protective film on a polarizing coating layer or one surface.

In the present invention, the photoluminescent ferroelectric liquid crystal molecules absorb light of the light source to perform photoluminescence, thereby representing colors, and specifically, may emit at least one light of red light, green light and blue light. The liquid crystal display of the present invention may variously dispose the photoluminescent ferroelectric liquid crystal molecules to implement RGB color, and thus, the colors may be implemented even without the color filter. A light absorption wavelength of the photoluminescent ferroelectric liquid crystal molecule is preferably UV wavelength of 365 to 390 nm, and a light emission wavelength thereof is preferably a visible light wavelength of 400 to 650 nm, but the light absorption wavelength and the light emission wavelength are not limited thereto.

The photoluminescent ferroelectric liquid crystal molecule is a ferroelectric liquid crystal molecule having photoluminescence, and may be 4-[(2-hydroxy-4-tetradecyloxy-benzylidene)-amino]-benzoic acid 3-[(2-hydroxy-4-tetradecyloxy-benzylidene)-amino]-phenyl ester, but is not limited thereto.

The photoluminescent ferroelectric liquid crystal molecules are uniaxially oriented. By uniaxially orienting the photoluminescent ferroelectric liquid crystal molecules, light from the light source may be linearly polarized light to serve as an upper polarizing plate, and even without the upper polarizing plate, a real black may be implemented. In the photoluminescent ferroelectric liquid crystal molecules, an arrangement direction may be changed depending on an electric field intensity to be applied, and thus, luminescence intensity of the polarizing light-emitting film may be adjusted.

The photoluminescent ferroelectric liquid crystal molecule has a physical-chemical property in which they are slightly tilted from the molecular long axis and they form a layered structure, such that in order to relieve steric hindrance that spontaneously occurs between the adjacent liquid crystal molecules, the photoluminescent ferroelectric liquid crystal molecules have a spread form in a specific unit, and form the layered structure having a wave-shaped undulation at an interface that may conflict between communities. A direction of an overall dipole moment of groups forming polarity in the molecules forming the layered structure matches a polarity director which is a side at which the liquid crystal molecules are bent, wherein when the electric field is applied, the liquid crystal molecules have polarization in the molecules by the electric field, and thus, the liquid crystal molecules have a specific orientation while rotating along the electric field direction. The liquid crystal molecules forming the layered structure rotate in a cone shape on the basis of a vertical direction axis of layers so that a direction in which the molecules are bent parallel to the electric field direction, such that the liquid crystal molecules form uniaxial orientation in the electric field direction. In addition, the orientation direction is changed depending on the electric field intensity to be applied, such that light absorption amount to be irradiated from the light source may be changed, and thus, photoluminescence intensity may be adjusted. For example, light incident in a direction perpendicular to the electric field may be maximally absorbed and emitted, and light incident in a direction parallel to the electric field may be minimally absorbed and emitted.

More specifically, as the electric field intensity to be applied is increased, an alignment degree of the molecules in an electric field direction is high, such that an absorption axis of the lower polarizing plate matches a direction in which the molecules are oriented (the absorption axis of the lower polarizing plate matches a direction in which the molecules are bent), and thus, a degree at which the liquid crystal molecules absorb light from the light source may be high, such that high photoluminescence may be represented. On the contrary, as the electric field intensity is decreased, the alignment degree of the molecules is low, which makes a relatively disordered state, and accordingly, the degree at which the liquid crystal molecules absorb light from the light source, and a photoluminescence degree are reduced, which may express dark.

In addition, another object of the present invention is to provide a method of a polarizing light-emitting film comprises: (a) modifying a substrate surface to be molecular phobic; (b) forming a droplet of photoluminescent ferroelectric liquid crystal molecules on the modified substrate surface; and (c) applying an electric field in a horizontal direction while cooling the droplet thereby uniaxially orienting the liquid crystal molecules.

In the present invention, the substrate may be formed of silicon dioxide ($SiO_2$), but is not limited thereto. For example, plastic, glass, metals, metal oxides, carbon materials, etc., may be used for the substrate.

In the present invention, in order to control a growth direction of the liquid crystal molecule and to express a single optical organization, it is preferred to modify the substrate to be molecular phobic.

In the present invention, in order to control the growth direction of the liquid crystal molecule and to express the single optical organization, in step (a), the substrate is modified to be molecular phobic by using a self-assembled monolayer (SAM) technique, but is not limited thereto. For example, a Teflon coating method or a vertical alignment polyimide film coating method may be used.

The self-assembled monolayer (SAM) technique is a system of controlling interfacial properties of a metal, a metal oxide and a semiconductor, and is a technique in which an organic assembly formed by adsorption of molecular construct from a solution phase or a gas phase is spontaneously aligned in a crystal structure to generate a defined organic surface having useful, changeable and chemical functionality at the exposed interface.

Further, the self-assembled monolayer (SAM) technique may expose the substrate to oxygen plasma so that a functional group of the substrate surface is substituted with a hydroxyl group, followed by forming covalent bond between the functional group of the substrate surface and perfluorooctyltrichlorosilane (FOTS) molecules to modify the substrate, but the self-assembled monolayer (SAM) technique is not limited thereto. For example, $SiO_x$ (x is 0<x<2), and dimethyloctadecyl[3-(trimethoxysilyl)propyl]ammonium chloride (DMOAP) may be used.

When the fluorinated tri-decafluoro-1,1,2,2-tetrahydrooctyl-trichlororosilane (FOTS) molecules are physically deposited on the substrate surface substituted with the hydroxyl group, and then, heat is applied to the substrate, the hydroxyl group of the substrate surface and a silane group of the FOTS molecule form a covalent bond to be uniformly assembled on the substrate surface. The hydroxyl group and $SiCl_3$ of the perfluorooctyltrichlorosilane (FOTS) molecule are uniformly assembled on the substrate surface, such that the substrate surface is modified to be molecular phobic having a low affinity with other molecules.

When the $SiO_x$ molecules are physically deposited on the substrate surface substituted with the hydroxyl group, and then, heat is applied to the substrate, the hydroxyl group of the substrate surface and Si of the $SiO_x$ molecules form a covalent bond to form a silicon oxide film, and the molecules are physically deposited on the substrate surface substituted with the hydroxyl group, and then, heat is applied to the substrate, hydrogen (H) of the hydroxyl group of the substrate surface is combined with chlorine (Cl) of dimethyloctadecyl[3-(trimethoxysilyl)propyl]ammonium chloride to remove hydrogen chloride (HCl), and oxygen (O) remaining on the substrate surface is combined with N of the DMOAP to form a film, and thus, the substrate is modified to be molecular phobic.

The Teflon coating method is a technique of forming a film by coating a Teflon material basically representing a molecular phobic property in most materials on the substrate in the presence of a solvent, and the vertical alignment polyimide film coating method is a technique of forming a polyimide film by coating a long alkyl chain of polyimide having a vertically aligned component on the substrate.

Figure 2:
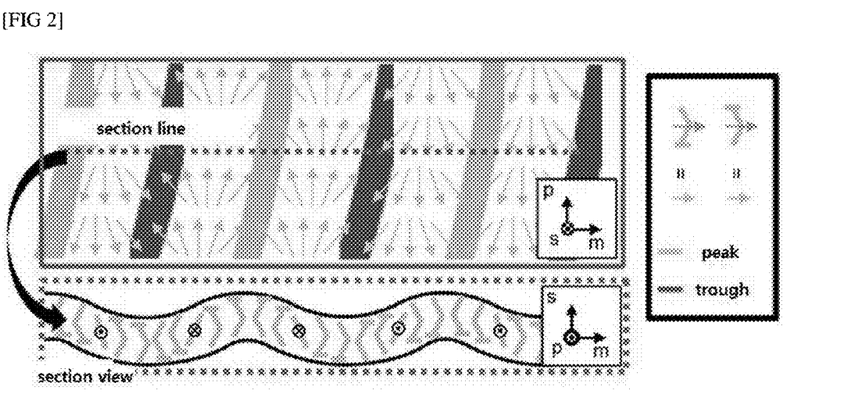
FIG. 2 illustrates a plane of a layered structure formed of photoluminescent ferroelectric liquid crystal molecules.
Figure 3:
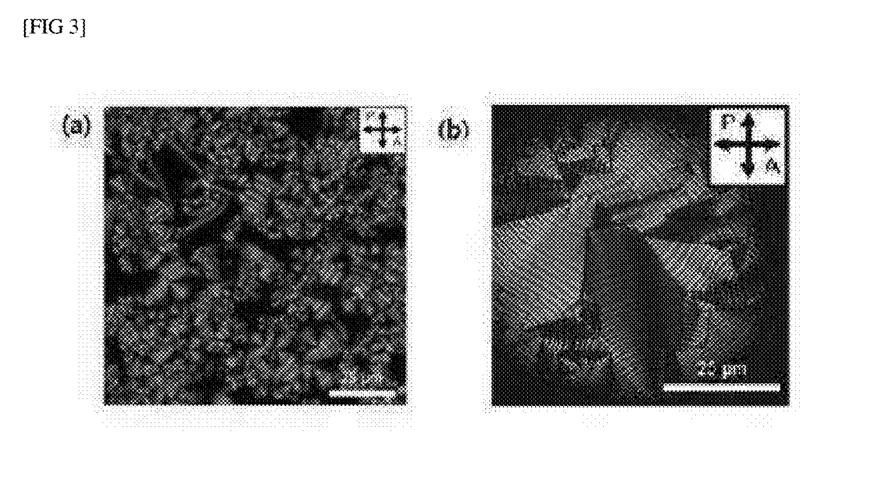
FIG. 3 shows optical structures observed by a polarization microscope, including (a) an optical structure observed by a polarization microscope when the photoluminescent ferroelectric liquid crystal molecules are expressed between molecular-philic substrates, and (b) an optical structure observed by the polarization microscope when the photoluminescent ferroelectric liquid crystal molecules are expressed between molecular-phobic substrates.

In the present invention, the photoluminescent ferroelectric liquid crystal molecule has a self-assembly property and a modulation property of electrical and optical properties by an external stimulation, and has a fluorescence property in a visible light region due to a benzene group included in the molecule. Further, the photoluminescent ferroelectric liquid crystal molecule has a physical-chemical property in which they are slightly tilted from the molecular long axis and they form a layered structure. Upon observing the layered structure formed of the photoluminescent ferroelectric liquid crystal molecules as a plane image, in order to relieve steric hindrance that spontaneously occurs between the adjacent liquid crystal molecules, the photoluminescent ferroelectric liquid crystal molecules distribute in a specific unit, and form the layered structure having a wave-shaped undulation at an interface that may conflict between communities as illustrated in FIG. 2. Structural analysis of the unique layered structure was found through x-ray scattering experiment and freeze-fracture TEM experiment (Science 301, 1204 (2003)), and the layered structure spontaneously formed at a nano level forms a bundle of microfilaments, and crowd growth thereof forms significantly various optical organizations. When the photoluminescent ferroelectric liquid crystal molecules express a liquid crystal phase between two molecular-philic substrates, a layer plane is perpendicular to the substrate, but the growth direction of the liquid crystal layer may not be controlled, such that various types of optical organizations are expressed as illustrated in panel (a) of FIG. 3, and when the photoluminescent ferroelectric liquid crystal molecules express a liquid crystal phase between two molecular-phobic substrates, the layer plane is parallel to the substrate, and the single optical organization is expressed as illustrated in panel (b) of FIG. 3.

In order to use the photoluminescent ferroelectric liquid crystal molecule as a substantial optical material, the growth direction of the photoluminescent ferroelectric liquid crystal molecule should be controlled, and a single optical organization needs to be expressed, and thus, the droplet of the liquid crystal molecules needs to be formed on the molecular phobic substrate.

In the present invention, in order to control the growth direction of the liquid crystal molecule and to uniaxially orient the droplet expressing the single optical organization, in step (b), the modified substrate surface is heated above an isotropic phase temperature and the droplet is formed thereon. The isotropic phase temperature is an isotropic phase temperature of the photoluminescent ferroelectric liquid crystal molecule, and in the method of the present invention, the modified substrate surface is heated above the isotropic phase temperature. For example, a temperature at which the modified substrate surface is heated may be 1 to 100° C., and more specifically, 1 to 50° C. higher than the isotropic phase temperature, but the temperature is not limited thereto.

In the present invention, the photoluminescent ferroelectric liquid crystal molecule is a ferroelectric liquid crystal molecule having photoluminescence, and may be 4-[(2-hydroxy-4-tetradecyloxy-benzylidene)-amino]-benzoic acid 3-[(2-hydroxy-4-tetradecyloxy-benzylidene)-amino]-phenyl ester, but is not limited thereto.

Figure 4:
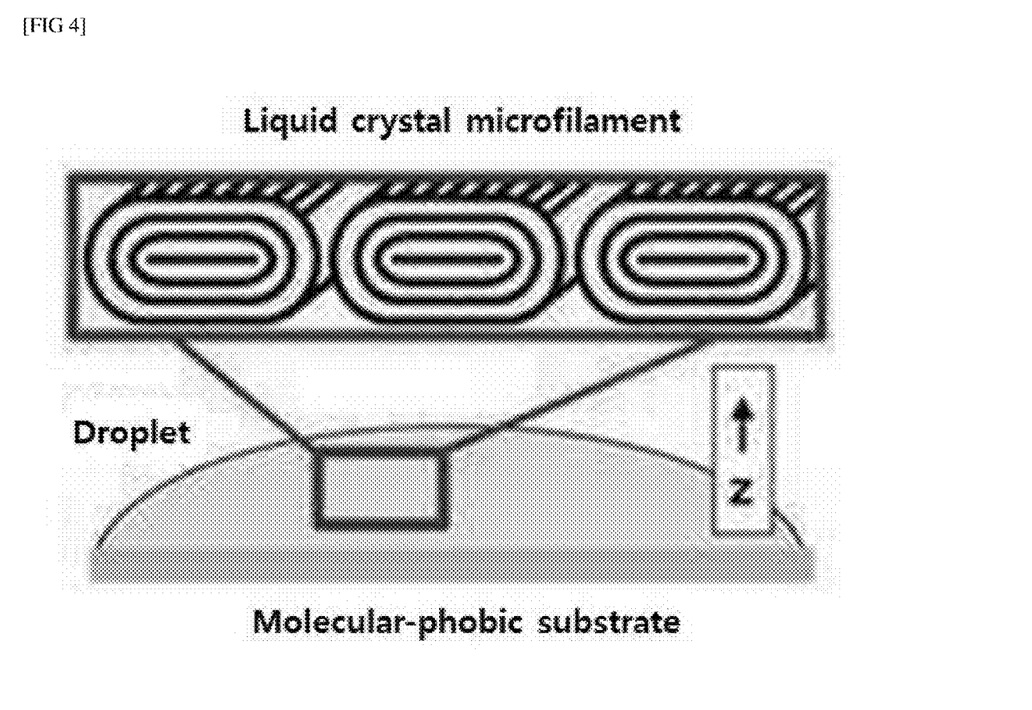
FIG. 4 illustrates a microfilament structure forming an inner part of a droplet of the liquid crystal molecules formed on the molecular-phobic substrate.

When the droplet of the liquid crystal molecule is formed on the substrate modified to be molecular phobic, the layer plane of the liquid crystal molecules is parallel to the substrate, and as illustrated in FIG. 4, a bundle of filaments forming the micro level of single optical organization is formed.

In the present invention, in step (c), the electric field in a horizontal direction is applied while cooling the droplet to orient the liquid crystal molecules. The direction of the overall dipole moment of the groups forming polarity in the molecules forming the layered structure matches the polarity director which is a side at which the liquid crystal molecules are bent, which indicates that when the electric field is applied, the polarity director of the liquid crystal molecules has an orientation in the electric field direction.

Figure 5:
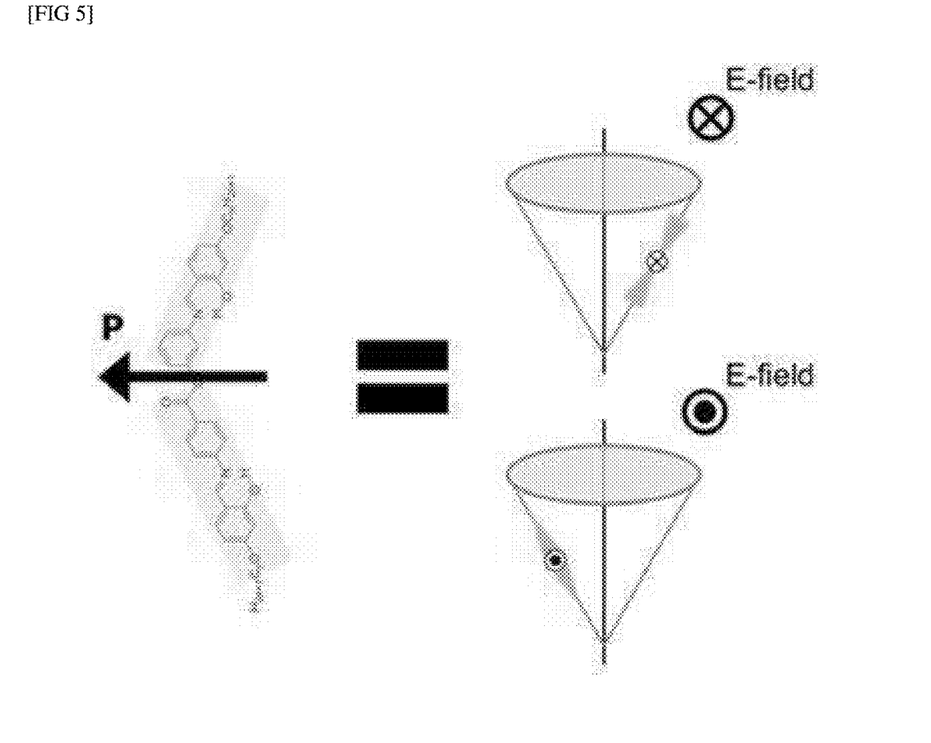
FIG. 5 illustrates a process in which the photoluminescent ferroelectric liquid crystal molecules form an orientation by an electric field to be applied.

The liquid crystal molecules forming the droplet have polarization in the molecules by the electric field, and thus, the liquid crystal molecules have a specific orientation while rotating along the electric field direction. When the electric field in the horizontal direction is applied to the droplet of the liquid crystal molecules formed on the substrate modified to be molecular phobic, as illustrated in FIG. 5, the liquid crystal molecules that are tilted at a predetermined angle to form the layered structure rotate in a cone shape on the basis of the vertical direction axis of layers so that the direction in which the liquid crystal molecules are bent matches the electric field direction, such that the liquid crystal molecules form uniaxial orientation in the electric field direction. When the electric field in the horizontal direction is applied to the droplet formed on the substrate surface, the liquid crystal molecules in the droplet is uniaxially oriented in the direction of the electric field in the horizontal direction, and thus, a uniaxially oriented dichroic polarizing light-emitting film is obtainable.

Figure 6:
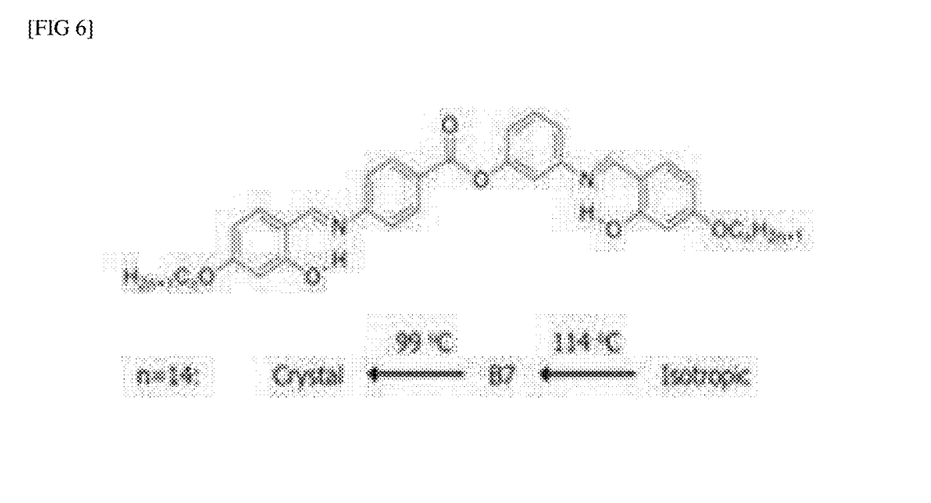
FIG. 6 illustrates properties of the photoluminescent ferroelectric liquid crystal molecules that are changed depending on temperature.

In the present invention, it is preferred that the electric field in the horizontal direction is applied while cooling the droplet of the liquid crystal molecules formed on the substrate modified to be molecular phobic at a predetermined speed from the isotropic phase temperature up to a temperature for expressing the liquid crystal phase. As illustrated in FIG. 6, the liquid crystal molecules express the liquid crystal phase between the isotropic phase temperature and a crystalline temperature. When the droplet is formed at a temperature above the isotropic phase temperature having a low crowd degree, and the electric field in the horizontal direction is applied while cooling the droplet at a predetermined speed of 1° C./min or less, the liquid crystal molecules have an orientation force from a stage in which the layered structure is spontaneously formed while representing the liquid crystal phase, and thus, a high degree of uniaxial orientation is obtainable as illustrated in FIG. 7.

Figure 7:
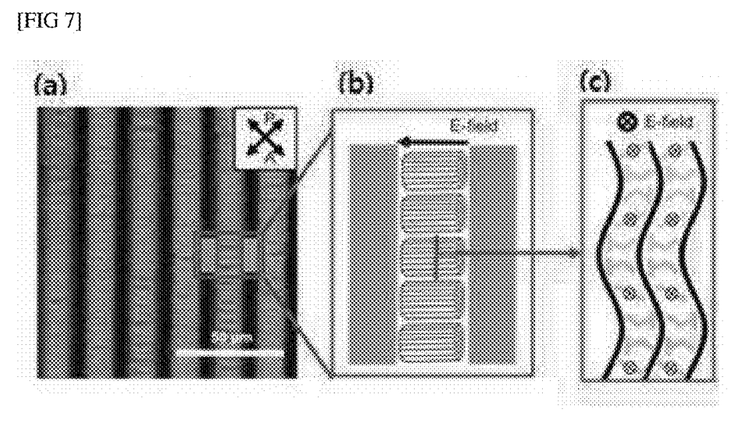
FIG. 7 shows the high degree of unity axial orientation that is obtainable for liquid crystal molecules, as illustrated by (a) a liquid crystal structure uniaxially oriented by an electric field applied in a horizontal direction observed by a polarizing microscope, (b) a schematic diagram of the microfilament structure forming orientation in an electric field direction inside the droplet, and (c) the liquid crystal molecules forming the microfilament.

FIG. 7 shows the high degree of unity axial orientation that is obtainable for liquid crystal molecules, as illustrated by (a) a liquid crystal structure uniaxially oriented by an electric field applied in a horizontal direction observed by a polarizing microscope, (b) a schematic diagram of the microfilament structure forming orientation in an electric field direction inside the droplet, and (c) the liquid crystal molecules forming the microfilament.

Figure 8:
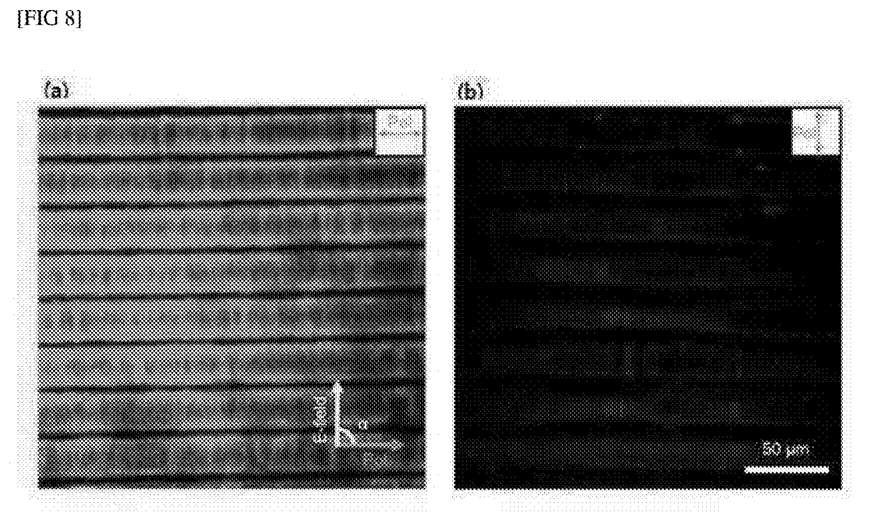
FIG. 8 shows optical microscopic images of light-emitting films, including (a) an optical microscopic image when an electric field direction and an incident light direction of a polarizing light-emitting film in which the photoluminescent ferroelectric liquid crystal molecules are uniaxially oriented are perpendicular, and (b) an optical microscopic image when the electric field direction and the incident light direction of the polarizing light-emitting film in which the photoluminescent ferroelectric liquid crystal molecules are uniaxially oriented are parallel.

In the present invention, the uniaxially oriented liquid crystal molecules represent strong light absorption and strong light emission in a uniaxial direction. As illustrated in FIG. 8, the uniaxially oriented liquid crystal molecules maximally absorb and emit light when the electric field direction is perpendicular to the incident light direction, and on the contrary, the uniaxially oriented liquid crystal molecules minimally absorb and emit light when the electric field direction is parallel to the incident light direction. The liquid crystal molecules have a fluorescence property in a visible light region due to four benzene groups, and a fluorescence axis matches a direction in which the molecules are tilted. Therefore, the fluorescence axis of the liquid crystal molecules forming the layered structure in the vertical direction and uniaxially oriented in the direction of the electric field in the horizontal direction represents (dichroic) polarization and luminescence property showing light emission only in the uniaxial direction, which exhibits strong light absorption and strong light emission in the direction perpendicular to the electric field direction, and the minimum light absorption and light emission in the direction parallel to the electric field direction.

FIG. 8 thus shows (a) an optical microscopic image when an electric field direction and an incident light direction of a polarizing light-emitting film in which the photoluminescent ferroelectric liquid crystal molecules are uniaxially oriented are perpendicular, and (b) an optical microscopic image when the electric field direction and the incident light direction of the polarizing light-emitting film in which the photoluminescent ferroelectric liquid crystal molecules are uniaxially oriented are parallel.

Figure 9:
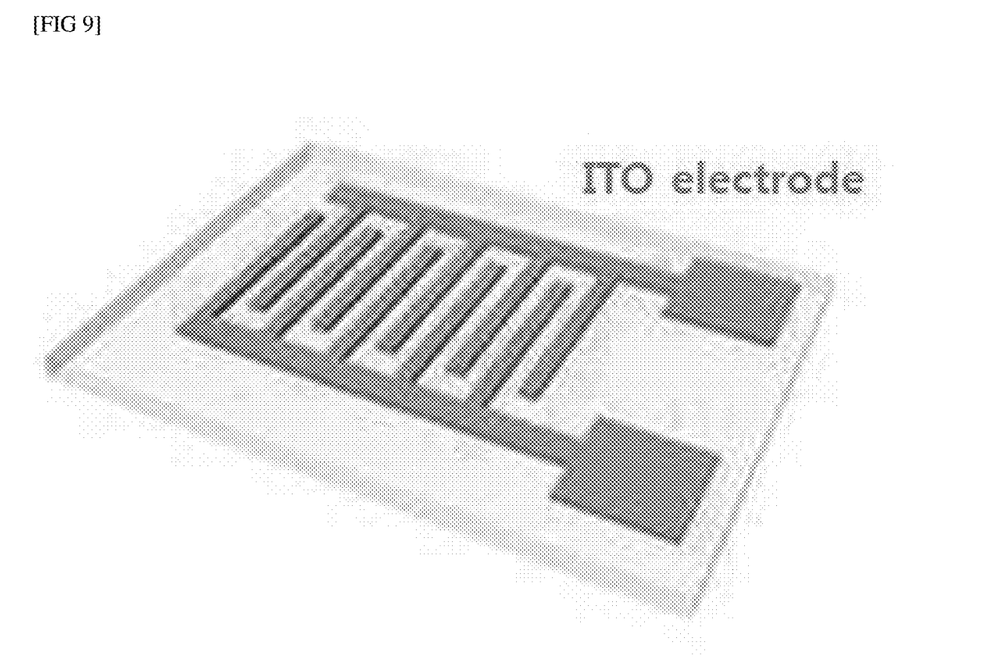
FIG. 9 illustrates an electrode to which the electric field is applied.

In the present invention, for the electric field in the horizontal direction, electrodes having a interdigitated structure are used as illustrated in FIG. 9. The electrode may be formed of indium tin oxide (ITO), but is not limited thereto. For example, the electrode may be formed of a metal having conductivity such as gold, copper, etc., an oxide, etc.

The electric field in the horizontal direction is an electric field applied between the interdigitated electrodes. The electric field is preferably applied with an alternating voltage having a frequency of 100 Hz or less.

Figure 10:
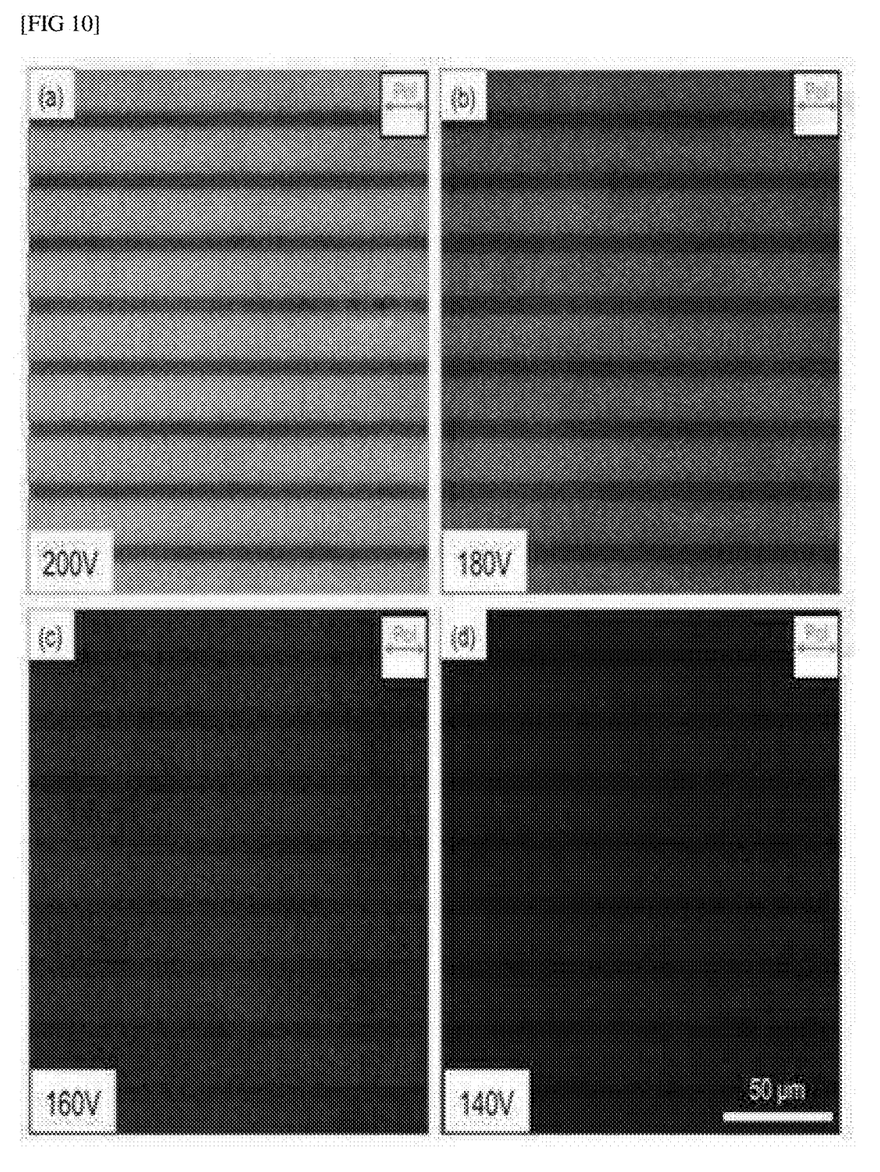
FIG. 10 illustrates change in luminescence intensity depending on intensity of the electric field applied to the polarizing light-emitting film, for applied voltages of (a) 200 V, (b) 180 V, (c) 160 V, and (d) 140 V.

The polarizing light-emitting film of the present invention consists of only single liquid crystal molecules to rapidly react to light and electric field, and thus, high-speed modulation of the polarization in real time is able to be performed. Further, in the polarizing light-emitting film of the present invention, as the electric field intensity is increased, the luminescence intensity is also increased as illustrated in FIG. 10, such that the luminescence intensity may be easily controlled only by adjusting the electric field. FIG. 10 illustrates change in luminescence intensity for applied electric field voltages of (a) 200 V, (b) 180 V, (c) 160 V, and (d) 140 V.

The polarizing light-emitting film of the present invention may simultaneously perform the light modulation role in which the film rapidly reacts to perform the high-speed modulation of the polarization, and the (dichroic) polarization and luminescence role in which the film maximally absorbs and emits light perpendicular to the electric field, and minimally absorbs and emits light parallel to the electric field, and a color reproduction role through the light modulation without the color filter. Since the polarizing light-emitting film of the present invention simultaneously acts as the liquid crystal layer that controls light phase, as the polarizing plate that adjusts light transmittance with regard to the controlled phase, and as the color filter that implements colors, when the polarizing light-emitting film is used for the liquid crystal display, the liquid crystal layer, the analyzer, and the color filter that are structural elements of the existing liquid crystal display may be substituted with the polarizing light-emitting film to increase light efficiency and power efficiency of the liquid crystal display.

Hereinafter, the following Examples of the present disclosure will be described in more detail. These Examples are provided only to illustrate the present invention and it will be apparent to those skilled in the art that they should not be construed as limiting the scope of the present disclosure.

Example 1

Modification of Substrate Surface to be Molecular Phobic

In order to prepare a substrate surface consisting of indium tin oxide (an electrode part of a crosslinking structure) and silicon dioxide to be a chemically active state in which the substrate is capable of forming a covalent bond with organic molecules, the substrate was washed with tertiary distilled water (18.3 MΩ/cm, Human Corp.), acetone (SAMCHUN Chemical), ethyl alcohol (SAMCHUN Chemical). The washed surface substrate was exposed to oxygen plasma (100 W, running time 2 min) so that an oxide functional group was substituted with a hydroxyl group to be exposed to the surface. The substrate of which the surface was substituted with the hydroxyl group was put into 2 ml vial, and the vial together with the substrate was sealed in a vacuum state, and exposed for 1 hour so that perfluorooctyltrichlorosilane (FOTS, Gelest) molecules were physically deposited on the substrate surface. The physically deposited substrate was taken out, and was maintained for 1 hour at 120° C. for a chemical bond between a silane group of the FOTS molecule and the hydroxyl group of the substrate surface to modify the substrate surface to be molecular phobic.

Formation of Uniaxially Oriented Liquid Crystal Film

The substrate surface modified to be molecular phobic was placed onto a heated stage (Linkam LTS420) heated above an isotropic phase temperature (114° C.), and a droplet of 4-[(2-hydroxy-4-tetradecyloxy-benzylidene)-amino]-benzoic acid 3-[(2-hydroxy-4-tetradecyloxy-benzylidene)-amino]-phenyl ester which is a photoluminescent ferroelectric liquid crystal molecule was formed on the substrate. In order to form a large area of self-assembly, an electric field in a horizontal direction was applied while cooling the droplet at a uniform cooling rate (0.01° C./min) using a thermostat (Linkam TMS94). For the self-assembly of the uniaxially aligned liquid crystal molecules, the electric field, 200V at 30 Hz, was applied by using a function generator (Agilent 33210A) while cooling the droplet.

As illustrated in panel (a) of FIG. 7, it was confirmed that lamellar liquid crystal molecules formed through self-assembly by the electric field in the horizontal direction applied during the cooling, formed uniaxial orientation in the electric field direction. As illustrated in panels (a) and (b) of FIG. 8, dichroic polarizing luminescence characteristics of a dichroic polarizing light-emitting film were confirmed by irradiating light on the liquid crystal film in which the liquid crystal molecules were uniaxially oriented, in a perpendicular direction and in a horizontal direction of the electric field. Further, as illustrated in panels (a) to (d) of FIG. 10, light intensity that was adjusted depending on electric field intensity in the dichroic polarizing light-emitting film produced as above was confirmed.

Example 2

A transparent substrate forming an upper plate with a TFT substrate was produced by a TFT forming process. The produced TFT substrate and the transparent substrate were washed with tertiary distilled water (18.3 MΩ/cm, Human Corp.), acetone (SAMCHUN chemical), ethyl alcohol (SAMCHUN chemical), and exposed to oxygen plasma (100 W, running time 2 min) so that an oxide functional group was substituted with a hydroxyl group to be exposed to the surface. The substrate of which the surface was substituted with the hydroxyl group was put into 2 ml vial, and the vial together with the substrate was sealed in a vacuum state, and exposed for 1 hour so that perfluorooctyltrichlorosilane (FOTS, Gelest) molecules were physically deposited on the substrate surface. The physically deposited substrate was taken out, and was maintained for 1 hour at 120° C. for a chemical bond between a silane group of the FOTS molecule and the hydroxyl group of the substrate surface to modify the substrate surface to be molecular phobic.

The substrate surface modified to be molecular phobic was placed onto a heated stage (Linkam LTS420) heated above an isotropic phase temperature (114° C.), and ferroelectric liquid crystal molecules such as 4-[(2-hydroxy-4-tetradecyloxy-benzylidene)-amino]-benzoic acid 3-[(2-hydroxy-4-tetradecyloxy-benzylidene)-amino]-phenyl ester, etc., having luminescence property that represents different color luminescence for each independent pixel formed by using a black matrix on the substrate were injected using an inkjet printing technique to form a droplet. In order to form a large area of self-assembly, an electric field in a horizontal direction, 200V at 30 Hz, was applied by using a function generator (Agilent 33210A) while cooling the droplet at a uniform cooling rate (0.01° C./min) using a thermostat (Linkam TMS94). Then, a liquid crystal display was produced by performing a module process for attaching a circuit, a polarizer, and a light source. As a result, it could be confirmed that light transmittance of the liquid crystal display of the present invention was about four times higher than that of the existing liquid crystal display. In addition, it could be confirmed that color could be implemented without the upper polarizing plate and the color filter.

According to the present invention, it is possible to produce the polarizing light-emitting film in which the photoluminescent ferroelectric liquid crystal molecules are uniaxially oriented to simultaneously act as the liquid crystal layer, the polarizing plate, and the color filter, and the liquid crystal display including the polarizing light-emitting film is capable of improving polarization and contrast, and implementing colors even without one polarizing plate and color filter, thereby increasing light efficiency and power efficiency and reducing production cost.

The present invention has been described in detail based on particular features thereof, and it is obvious to those skilled in the art that these specific technologies are merely preferable embodiments and thus the scope of the present invention is not limited to the embodiments. Therefore, the substantial scope of the present invention is defined by the accompanying claims and equivalent thereof.

The invention claimed is:

1. A method of producing a polarizing light-emitting film comprises:
    (a) modifying a substrate surface to be molecular phobic;
    (b) forming a droplet of photoluminescent ferroelectric liquid crystal molecules on the modified substrate surface; and
    (c) applying an electric field in a horizontal direction while cooling the droplet thereby uniaxially orienting the liquid crystal molecules,
    wherein the photoluminescent ferroelectric liquid crystal molecule is 4-[(2-hydroxy-4-tetradecyloxy-benzylidene)-amino]-benzoic acid 3-[(2-hydroxy-4-tetradecyloxy-benzylidene)-amino]-phenyl ester.

2. The method of claim 1, wherein the modifying of the substrate surface to be molecular phobic uses at least one selected from the group consisting of a self-assembled monolayer (SAM) technique and a vertical alignment polyimide film coating method.

3. The method of claim 2, wherein the self-assembled monolayer (SAM) technique uses at least one selected from the group consisting of FOTS (fluorinated tri-decafluoro-1, 1,2,2-tetrahydrooctyl-trichlorosilane), SiOx (where x is 0<x<2), and DMOAP (dimethyloctadecyl[3-(trimethoxysilyl)propyl]ammonium chloride).

4. The method of claim 1, wherein the droplet of the photoluminescent ferroelectric liquid crystal molecules is formed on the substrate surface heated above an isotropic phase temperature.

5. The method of claim 1, wherein a layer plane of the liquid crystal molecules in the droplet is parallel to the substrate.

6. The method of claim 1, wherein a bent direction of the liquid crystal molecules in the droplet is oriented parallel to a direction of the applied electric field direction.

7. A liquid crystal display comprising:

a light generator;

a polarizer; and a polarizing light-emitting film n comprising photoluminescent ferroelectric liquid crystal molecules that are uniaxially oriented, wherein the photoluminescent ferroelectric liquid crystal molecule is 4-[(2-hydroxy-4-tetradecyloxy-benzylidene)-amino]-benzoic acid 3-[(2-hydroxy-4-tetradecyloxy-benzylidene)-amino]-phenyl ester.

8. The liquid crystal display of claim 7, wherein the polarizing light-emitting film absorbs ultraviolet rays and emits visible light.

9. The liquid crystal display of claim 7, wherein the polarizing light-emitting film emits at least one light selected from the group consisting of red light, green light, and blue light.

10. The liquid crystal display of claim 7, wherein a luminescence intensity of the polarizing light-emitting film is adjusted depending on an electric field intensity.

11. The liquid crystal display of claim 7, wherein an arrangement direction of the photoluminescent ferroelectric liquid crystal molecules is changed depending on the electric field intensity.

\* \* \* \* \*

UNITED STATES PATENT AND TRADEMARK OFFICE
CERTIFICATE OF CORRECTION

PATENT NO.       : 10,162,213 B2
APPLICATION NO.  : 15/296848
DATED            : December 25, 2018
INVENTOR(S)      : Dong Ki Yoon et al.

Page 1 of 1

It is certified that error appears in the above-identified patent and that said Letters Patent is hereby corrected as shown below:

On the Title Page

On Page 2, left hand column, Line 1, under the heading "Other Publications", in the title of the Kim, H. et al. reference, "Nanofilannents" should be -- Nanofilaments --.

In the Claims

In Column 13, Line 15, the letter "n" should be deleted between "film" and "comprising".

Signed and Sealed this
Fourteenth Day of May, 2019

Andrei Iancu
*Director of the United States Patent and Trademark Office*